(12) United States Patent
Shen et al.

(10) Patent No.: US 9,595,260 B2
(45) Date of Patent: Mar. 14, 2017

(54) MODELING DEVICE AND METHOD FOR SPEAKER RECOGNITION, AND SPEAKER RECOGNITION SYSTEM

(75) Inventors: Haifeng Shen, Beijing (CN); Long Ma, Beijing (CN); Bingqi Zhang, Beijing (CN)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 24 days.

(21) Appl. No.: 13/989,508

(22) PCT Filed: Dec. 10, 2010

(86) PCT No.: PCT/CN2010/079650
§ 371 (c)(1),
(2), (4) Date: May 24, 2013

(87) PCT Pub. No.: WO2012/075640
PCT Pub. Date: Jun. 14, 2012

(65) Prior Publication Data
US 2013/0253931 A1 Sep. 26, 2013

(51) Int. Cl.
G10L 17/04 (2013.01)
(52) U.S. Cl.
CPC .................... *G10L 17/04* (2013.01)
(58) Field of Classification Search
CPC .................. G10L 17/04; G10L 2015/0631
USPC .................................. 704/243, 245
See application file for complete search history.

(56) References Cited

U.S. PATENT DOCUMENTS

| 5,895,447 A | 4/1999 | Ittycheriah et al. |
| 6,058,363 A | 5/2000 | Ramalingam |
| 6,073,096 A * | 6/2000 | Gao et al. ............... 704/245 |
| 6,107,935 A * | 8/2000 | Comerford et al. ......... 340/5.52 |
| 6,389,393 B1* | 5/2002 | Gong ........................ 704/244 |

(Continued)

FOREIGN PATENT DOCUMENTS

| CN | 1447278 | 10/2003 |
| CN | 1514432 | 7/2004 |

(Continued)

OTHER PUBLICATIONS

Sturim et al, "Speaker Indexing in Large Audio Databases Using Anchor Models," 2001, Proceedings of IEEE International Conference on Acoustics, Speech, and Signal Processing, vol. 1, pp. 429-432.*

(Continued)

*Primary Examiner* — David Hudspeth
*Assistant Examiner* — Oluwadamilola M Ogunbiyi
(74) *Attorney, Agent, or Firm* — Wenderoth, Lind & Ponack, L.L.P.

(57) ABSTRACT

A modeling device comprises a front end which receives enrollment speech data from each target speaker, a reference anchor set generation unit which generates a reference anchor set using the enrollment speech data based on an anchor space, and a voice print generation unit which generates voice prints based on the reference anchor set and the enrollment speech data. By taking the enrollment speech and speaker adaptation technique into account, anchor models with a smaller size can be generated, so reliable and robust speaker recognition with a smaller size reference anchor set is possible.

25 Claims, 6 Drawing Sheets

(56) References Cited

U.S. PATENT DOCUMENTS

| | | | |
|---|---|---|---|
| 2002/0178004 A1* | 11/2002 | Chang et al. | 704/246 |
| 2003/0220791 A1* | 11/2003 | Toyama | 704/256 |
| 2004/0030552 A1* | 2/2004 | Omote et al. | 704/245 |
| 2004/0122672 A1 | 6/2004 | Bonastre et al. | |
| 2004/0186724 A1 | 9/2004 | Morin | |
| 2004/0230420 A1* | 11/2004 | Kadambe et al. | 704/205 |
| 2004/0236573 A1 | 11/2004 | Sapeluk | |
| 2004/0260550 A1* | 12/2004 | Burges et al. | 704/259 |
| 2006/0253284 A1* | 11/2006 | Mami et al. | 704/250 |

FOREIGN PATENT DOCUMENTS

| | | |
|---|---|---|
| CN | 1543641 | 11/2004 |
| CN | 1787077 | 6/2006 |
| EP | 0 852 374 | 7/1998 |
| EP | 1 431 959 | 6/2004 |

OTHER PUBLICATIONS

Mami et al, "Speaker identification by anchor models with PCA/LDA post-processing," Apr. 6-10, 2003, Proceedings of IEEE International Conference on Acoustics, Speech, and Signal Processing, vol. 1, pp. I-180-I183.*

Goto et al, "An investigation on speaker vector-based speaker identification under noisy conditions," Jul. 7-9, 2008, International Conference on Audio, Language and Image Processing, pp. 1430-1435.*

Yang et al, "A Rank based Metric of Anchor Models for Speaker Verification," Jul. 9-12, 2006, IEEE International Conference on Multimedia and Expo, pp. 1097-1100.*

Hautamäki et al, "Maximum a Posteriori Adaptation of the Centroid Model for Speaker Verification" IEEE Signal Processing Letters vol. 15, 2008, pp. 162-165.*

Wang et al, "Online Bayesian Tree-Structured Transformation of HMMs With Optimal Model Selection for Speaker Adaptation" IEEE Speech and Audio Processing, vol. 9, No. 6, 2001, pp. 663-677.*

Kenny et al, "Speaker and Session Variability in GMM-Based Speaker Verification" IEEE Trans Audio, Speech and Language Processing, vol. 15, No. 4, May 2007, pp. 1448-1460.*

Kuhn et al, "Rapid Speaker Adaptation in Eigenvoice Space" IEEE Trans on Speech and Audio Processing, vol. 8, No. 6, Nov. 2000, pp. 695-707.*

Collet et al, "Speaker Tracking by Anchor Models Using Speaker Segment Cluster Information," IEEE International Conference on Acoustics Speech and Signal Processing Proceedings. vol. 1. IEEE, 2006, pp. I-1009-I-1012.*

Slaney M., "Semantic—Audio Retrieval," IEEE International Conference on Acoustics, Speech, and Signal Processing, May 2002, pp. IV-4108-IV-4111.*

International Search Report (ISR) mailed Sep. 15, 2011 in International (PCT) Application No. PCT/CN2010/079650.

Chinese Office Action (in English) issued Jun. 3, 2014 in the corresponding Chinese Patent Application No. 2010800703219.

D. E. Sturim, et al., IEEE, 2001, "Speaker Indexing in Large Audio Databases Using Anchor Models," pp. 429-432.

* cited by examiner

MODELING DEVICE AND METHOD FOR SPEAKER RECOGNITION, AND SPEAKER RECOGNITION SYSTEM

TECHNICAL FIELD

The present disclosure is related to speech (audio) processing and recognition technology, and also related to the technology of speaker verification, telephone conference, and digital network audio & video.

BACKGROUND

Speaker recognition technique is very useful for many applications, e.g. speaker tracking, audio index and segmentation. Recently, it has been proposed to model a speaker using several anchor (speaker) models. The speaker voice is projected on the anchor models to constitute vector representing acoustic characteristics of the speaker.

FIG. 1 shows a block diagram of a conventional device for speaker recognition. As shown in the FIG. 1, an anchor space is created by training speeches from a lot of general speakers. In a reference anchor set generation unit 102, a number of virtual anchor speakers which are the centriods of clusters are selected from the anchor space to form a reference anchor set, or the nearest anchor speaker to the centroid of each cluster is selected to form the reference anchor set. A front end 101 receives an enrollment speech by a target speaker and converts the enrollment speech into feature parameters, and sends the feature parameters to a voice print generation unit 103. The voice print generation unit 103 generates a voice print based on the feature parameters sent from the front end 101 and the reference anchor set generated by the reference anchor set generation unit 102. Then, the generated voice print is stored into a voice print database 104 for further use for speaker recognition. As can be seen from the FIG. 1 the reference anchor set generated by the device 100 can reflect the distribution of the anchor space itself only. Accordingly, a larger number of anchors are needed to describe the target speaker better, which makes the computation load higher and more difficult to be used in the embedded system.

SUMMARY

In one aspect of the present disclosure, there is provided a modeling device for speaker recognition, comprising: a front end which receives enrollment speeches from target speakers; a reference anchor set generation unit which generates a reference anchor set using the enrollment speeches based on an anchor space; and a voice print generation unit which generates voice prints based on the reference anchor set and the enrollment speeches.

In another aspect of the present disclosure, there is provided a modeling method for speaker recognition, comprising steps of: receiving enrollment speeches from target speakers; generating a reference anchor set using the enrollment speeches based on an anchor space; and generating voice prints based on the reference anchor set and enrollment speeches.

In a further aspect of the present disclosure, there is provided a speaker recognition system comprises: a front end which receives enrollment speeches and/or testing speeches from target speakers; a reference anchor set generation unit which generates a reference anchor set using the enrollment speeches based on an anchor space; a voice print generation unit which generates voice prints based on the reference anchor set and the enrollment speeches and/or testing speeches; a matching unit which compares the voice prints generated from the testing speeches with the voice prints generated from the enrollment speeches; and a decision unit which recognizes the identity of the target speakers based on the result of the comparison.

In another further aspect of the present disclosure, there provided a speaker recognition system comprises a modeling device and a recognition device, wherein, the modeling device comprising: a first front end which receives enrollment speeches from target speakers; a reference anchor set generation unit which generates a reference anchor set using the enrollment speeches based on an anchor space; and a first voice print generation unit which generates first voice prints based on the reference anchor set and the enrollment speeches, and the recognition device comprising: a second front end which receives testing speeches from the target speakers; a second voice print generation unit which generates second voice prints based on the reference anchor set and the testing speeches; a matching unit which compares the first voice prints with the second voice prints; and a decision unit which recognizes the identity of the target speakers based on the result of comparison.

With the modeling device, method, and speaker recognition system of the present disclosure, by taking the enrollment speech and speaker adaptation technique into account, anchor models with smaller size can be generated, and reliable and robust speaker recognition with smaller size reference anchor set is possible. It brings great advantages for computation speed improvement and great memory reduction, such low computation and small reference anchor set is more suitable for embedded application.

The foregoing is a summary and thus contains, by necessity, simplifications, generalizations, and omissions of details; consequently, those skilled in the art will appreciate that the summary is illustrative only and is not intended to be in any way limiting. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
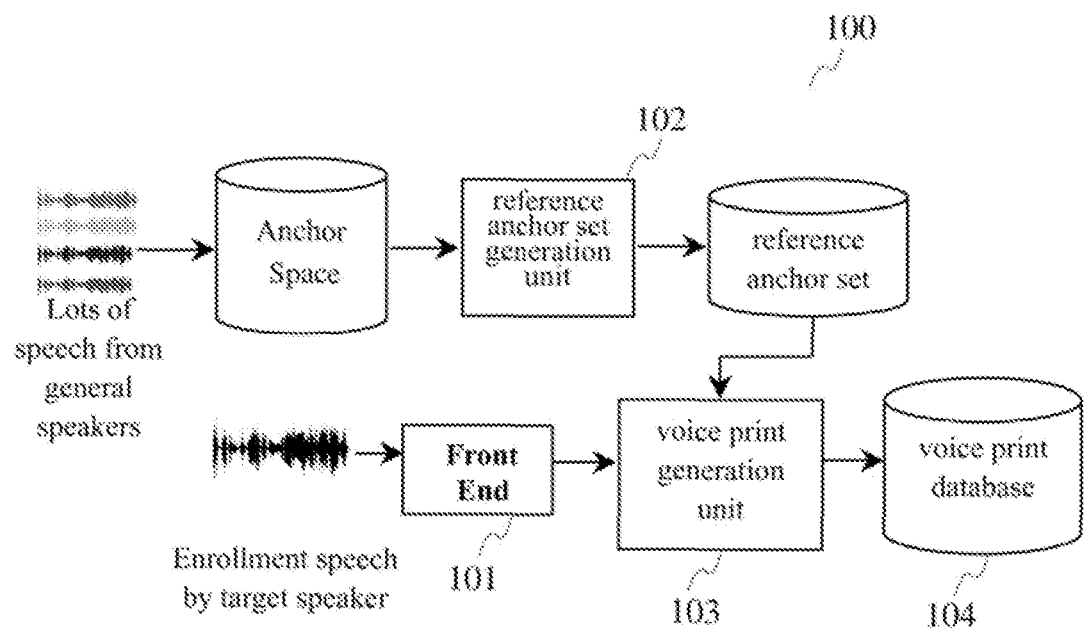
FIG. 1 shows a block diagram of a conventional device for speaker recognition.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The main terms used in the present disclosure will be introduced as follows:

1) Anchor Database

Generally, there are voice data from hundreds or thousands of speakers in the training corpus. Anchor model (e.g. Gaussian mixture model) representing the acoustic characteristic of each speaker can be trained. The anchor database is constructed if all anchor models are put together.

2) Reference Anchor Set

Reference anchor set are defined as those generated from the anchor database according to specific generation rules, which is used for speaker verification/identification system.

3) Anchor Space

If each anchor model represents one dimension of the space, the anchor space can be constructed when all anchor models in the anchor database are used. The dimension of the anchor space is equal to the total number of anchor models in the anchor database, 4) Principal Anchor Model The principal anchor model is defined as the nearest model with respect to one speakers enrollment speech.

5) Associate Anchor Model

Except the principal anchor, the remainder models in the reference anchor set are defined as associate anchor models.

Figure 2:
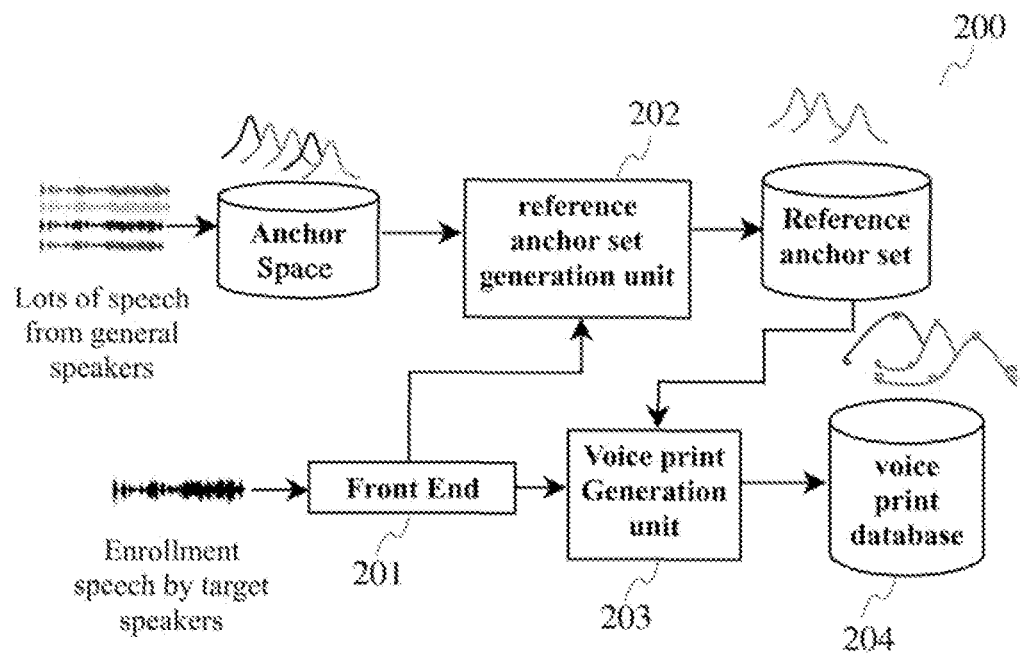
FIG. 2 shows a block diagram of a modeling device for speaker recognition according to one embodiment of the present disclosure.

FIG. 2 shows a block diagram of a modeling device for speaker recognition according to one embodiment of the present disclosure.

As shown in the FIG. 2, the modeling device 200 for speaker recognition according to one embodiment of the present disclosure includes: a front end 201, a reference anchor set generation unit 202, a voice print generation unit 203 and a voice print database 204. In the above structure, for example, the voice print generation unit 203 is connected to the front end 201, reference anchor set generation unit 202 and voice print database 204. The front end 201 is also connected to the reference anchor set generation unit 202.

According to one embodiment of the present disclosure, in the modeling device 200, the front end 201 receives enrollment speeches from target speakers, the reference anchor set generation unit 202 generates a reference anchor set using the enrollment speeches based on an anchor space, and the voice print generation unit 203 generates voice prints based on the reference anchor set and the enrollment speeches.

Hereinafter, the description will be given to the operations of the above respective units of the modeling device 200 according to the embodiment of the present disclosure.

An anchor space is firstly created by training lots of speeches from general speakers, and the anchor space includes a plurality of anchor models which represent the acoustic characteristics of those general speakers. The anchor space can be stored in a database as a form of the anchor database. The front end 201 receives enrollment speeches by target speakers, and converts the enrollment speeches into feature parameters, and sends the feature parameters to the reference anchor set generation unit 202 and the voice print generation unit 203. The reference anchor set generation unit 202 generates a reference anchor set from the anchor space based on the enrollment speeches by target speakers. The voice print generation unit 203 generates voice prints by applying the feature parameters extracted from the enrollment speeches and sent from the front end 201 onto the anchor models of the reference anchor set generated by the reference anchor set generation unit 202, and stores the generated voice prints into the voice print database 204 for further use for speaker recognition.

Since the operations of the front end 201 and the voice print generation unit 203 are well known by those skilled in the art, the details thereof will be omitted in order not to confuse the main points of the present disclosure. In the following, the operation of the reference anchor set generation unit 202 will be described in detail.

According to another embodiment of the present disclosure, the reference anchor set generated by the reference anchor set generation unit 202 is composed of at least one principal anchors and at least one associate anchors, and the reference anchor set generation unit 202 generates the principal anchors by using the enrollment speeches based on the anchor space, and generates the at least one associate anchors based on the principal anchors.

It is assumed that if there are enrollment speeches of "n" target speakers, then the number of the principal anchors which are generated could be 1 to n, and it is preferred that n principal anchors are generated based on the enrollment speeches from the n target speakers.

Figure 3:
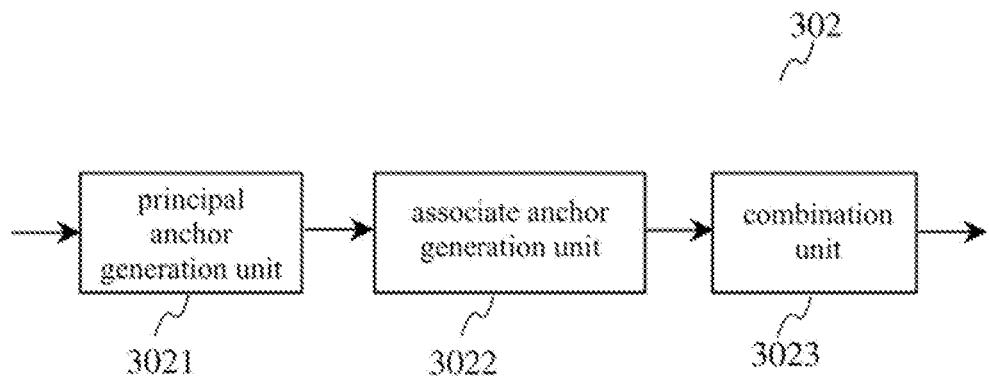
FIG. 3 shows a block diagram of a reference anchor set generation unit according to one embodiment of the present disclosure.

FIG. 3 shows a block diagram of the reference anchor set generation unit according to one embodiment of the present disclosure. The functions of the reference anchor set generation unit 302 is the same as those of the reference anchor set generation unit 202 as shown in the FIG. 2. As shown in the FIG. 3, the reference anchor set generation unit 302 includes a principal anchor generation unit 3021, an associate anchor generation unit 3022 and a combination unit 3023.

Specifically, the principal anchor generation unit 3021 generates a principal anchor by finding an anchor model with the nearest distance to the model of enrollment speech of the target speaker from the anchor space. Here, the model of enrollment speech can also be a GMM (Gaussian mixture model) which represents the acoustic characteristic of the target speaker, and can be calculated by the front end 201 or the reference anchor set generation unit 302 with the feature parameters of the enrollment speech of the target speaker. At least one principal anchors are generated dependent on the number of the target speakers. The associate anchor generation unit 3022 generates the associate anchors by splitting the anchor space into a plurality of clusters based on the principal anchors, and finding anchor models with the nearest distance to the centroids of the plurality of clusters containing no principal anchors. Here, the distance can be a likelihood value. The combination unit 3023 combines the generated principal anchors and associate anchors together as the reference anchor set.

Hereinafter, the description will be given to the operations of the above respective units of the reference anchor set generation unit 302 according to one embodiment of the present disclosure.

Firstly, in the principal anchor generation unit 3021 the principal anchors are generated by using the enrollment speeches by target speakers. Specifically, the principal anchor for one target speaker can be obtained by finding the anchor model with the nearest distance to the GMM model of enrollment speech of the target speaker in the anchor space. More specifically and according to one embodiment of the present disclosure, likelihood distance may be used as the above distance.

For example, the likelihood distance between the target speaker and each general speaker existing in the anchor space is computed with the enrollment speech from the target speaker. It is firstly assumed that each speaker $i$ in the anchor space is modeled by a probability model such as a GMM (Gaussian mixture model) $\Lambda_i$ with parameters $\{p_{ij}, \mu_{ij}, \Sigma_{ij}\}$, j=1, 2, . . . , $M_i$, where $M_i$ denotes the number of mixture components, $p_{ij}$ denotes the mixture gain, and $\mu_{ij}$ and $\Sigma_{ij}$ are the mean vector and the diagonal covariance matrix, respectively, of each Gaussian mixture component. The enrollment speech X of the target speaker has voice frames $[x_1, x_2, x_3, \ldots, x_T]$ where T is the total frame number. Therefore, the likelihood distance is obtained as the equation (1) below.

$$P(X \mid \Lambda_i) = \prod_{t=1}^{T} \sum_{k=1}^{M} p_{ij} \frac{1}{\sqrt{2\pi\Sigma_{ij}}} \exp[-(x_t - \mu_{ij})\Sigma_{ij}^{-1}(x_t - \mu_{ij})] \quad (1)$$

Subsequently, the nearest speaker model of general speaker is found as the principal anchor for example by computing arg $\max_i P(X|\Lambda_i)$. It should be noted that if more than one target speakers exist, the above operations can be repeated to get multiple principle anchors. Thus the number of generated principle anchors is not limiting of scope of the present disclosure. Also, the distance is not limited to the likelihood distance.

Then, in the associate anchor generation unit 3022, the associate anchors are generated based on the principal anchors generated by the principal anchor generation unit 3021.

According to one embodiment of the present disclosure, the process of the anchor space being split into the plurality of clusters is as follows: firstly, the anchor space is split into N clusters, here, N equals to the number of the principal anchors. One cluster with the biggest intra-class distance among the N clusters are found to be further split, here, if the cluster has a principal anchor, the cluster is split into two sub-clusters based on the principal anchor and an anchor with the farthest distance to the principal anchor in the cluster, while if the cluster has no principal anchor, the cluster is split into two sub-clusters based on two farthest anchors in the cluster with respect to the farther principal anchor. The above process is repeated until the plurality of clusters is obtained.

Specifically, the anchor space is initially split into N clusters (N equals the number of the principal anchors) according to the distance between each anchor in the anchor space and the generated principal anchors. Each of the obtained N clusters contains one principal anchor generated by the principal anchors generation unit 3021. Here, the distance can be a likelihood value. For example, Kullback-Leibler (KL) divergence distance or Euclidean distance can be used as the above distance. Taking Euclidean distance as an example, the Euclidean distance between two GMMs $\Lambda_1$ and $\Lambda_2$ is given as the equation (2) below, $$e = \int \Lambda_1^2 dx + \int \Lambda_2^2 dx - 2 \int \Lambda_1 \Lambda_2 dx \quad (2)$$

$$= \sum_{i=1}^{I} \sum_{j=1}^{J} p_i p_j Q_{i,j,1,1} + \sum_{i=1}^{I} \sum_{j=1}^{J} p_i p_j Q_{i,j,2,2} - 2 \sum_{i=1}^{I} \sum_{j=1}^{J} p_i p_j Q_{i,j,1,2}$$

where $$Q_{i,j,k,m} = \int N_1(x, \mu_{ki}, \Sigma_{ki}) N_1(x, \mu_{mj}, \Sigma_{mj}) dx \quad (3)$$

Herein, k, m=1, 2, only representing the indexes of the two GMMs.

Next, the operation of finding one cluster with the biggest intra-class distance to be further split is repeated until the total number of clusters is satisfied. The number of clusters can be predetermined by requirements of the practical applications. The step of splitting is based on the following rule:

if the cluster selected to be split has a principal anchor, an anchor with the farthest distance to the principal anchor in this cluster is found, each of rest anchors in this cluster is compared with the two anchors (the anchor with the farthest distance and the principal anchor) for classification, and this cluster is split into two sub-clusters based on the comparison; otherwise if the cluster selected to be split has no principal anchor, two farthest anchors in the cluster with respect to the father principal anchor, that is, the principal anchor included in the father cluster from which the cluster is split are found, each of rest anchors in this cluster is compared with these two anchors for classification, and this cluster is split into two sub-clusters based on the comparison.

For instance, the comparisons are performed according to the distance between two anchors as described above. The anchor space is split into the desired number of clusters after the above operation is repeated as described above.

Subsequently, anchors nearest to the centroids of the clusters other than the clusters containing principle anchors are found as associate anchors. According to one embodiment of the present disclosure, the centroids may be obtained according to scaled Bhattacharyya distance. For example, the distance measure for combining the GMMs in each cluster to obtain each centroid is based on the scaled Bhattacharyya distance which is given as the equation (4) below, $$B_{SD} = B_{scale} B_{distance} = B_{scale} [-\log \int \sqrt{\Lambda_i \Lambda_j} dx]$$

The selection of anchors nearest to the centriods can, for example, use the above KL/Euclidean distance.

Finally, in the combination unit 3023, the principal anchors generated by the principal anchors generation unit 3021 and the associate anchors generated by the associate anchors generation unit 3022 are combined as a reference anchor set for further use for speaker recognition.

Figure 4:
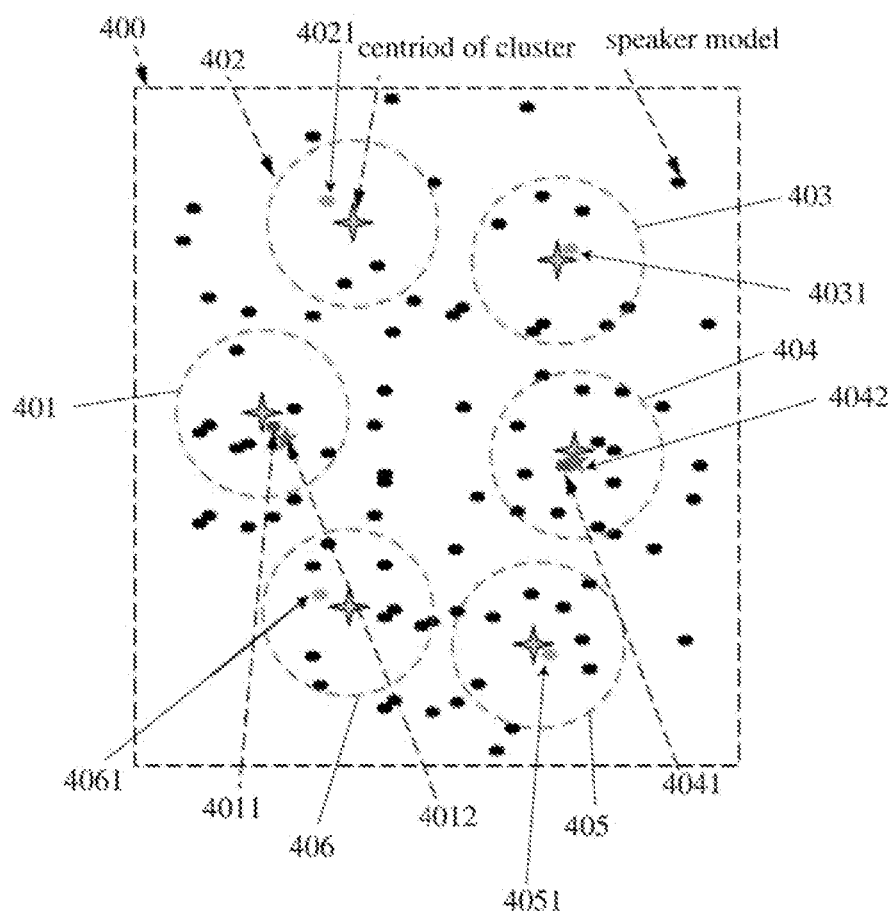
FIG. 4 shows a schematic diagram of an anchor space according to one embodiment of the present disclosure.

FIG. 4 shows a schematic diagram of an anchor space 400 according to one embodiment of the present disclosure. In the FIG. 4, by taking a case of two target speakers as an example, a result after processing by the reference anchor set generation unit 302 of the FIG. 3 is shown. As shown in the FIG. 4, there are totally six split clusters 401, 402, 403, 404, 405 and 406 in the anchor space 400. Two principal anchors 4011 and 4041 respectively located in the clusters 401 and 404, are generated by the principal anchor generation unit 3021 based on the enrollment speech data 4012 and 4042 of speaker 1 and speaker 2 as described above. By the above operation of splitting based on the two principal anchors 4011 and 4041, the associate anchors generation unit 3022 generates four associate anchors 4021, 4031, 4051 and 4061 respectively located in the clusters 402, 403, 405 and 406 which containing no principal anchor. The combination of the two principal anchors 4011 and 4041 as well as four associate anchors 4021, 4031, 4051 and 4061 is the reference anchor set generated by the reference anchor set generation unit 302. Note that the total number of the split clusters is not limited to six, and those skilled in the art should understand that the total number of clusters can be appropriately set to be any other numerals.

Figure 5:
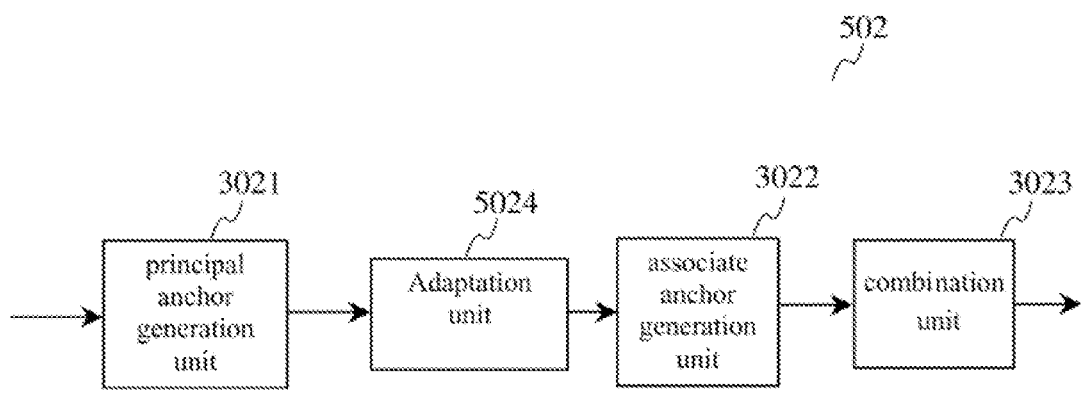
FIG. 5 shows a block diagram of a reference anchor set generation unit according to another embodiment of the present disclosure.

According to one embodiment of the present disclosure, a reference anchor set generation unit may further include an adaptation unit. FIG. 5 shows a block diagram of a reference anchor set generation unit 502 in the modeling device 200 according to one embodiment of the present disclosure.

As can be seen from the FIG. 5, the reference anchor set generation unit 502 is different from the reference anchor set generation unit 302 of the FIG. 3 in that an adaptation unit 5024 is added between the principal anchor generation unit 3021 and the associate anchor generation unit 3022.

Specifically, the principal anchors generated by the principal anchor generation unit 3021 are input into the adaptation unit 5024. In the adaptation 5024, speaker adaptation techniques such as MLLR (Maximum Likelihood Linear Regression)/MAP (Maximum A Posteriori) etc. can be used on the generated principal anchors, and the refined principal anchors after the adaptation is output to the associate anchor generation unit 3022. In the associate anchor generation unit 3022, the refined principal anchors guide to split the anchor space and to find the associate anchors with the operation described before. Since the adaptation technology is a common technology, the details thereof will not be described hereinafter.

That is to say, the principal anchors can be adapted with the enrollment speech by adaptation method such as MAP or MLLR in the adaptation unit 5024, and the associate anchors can be generated based on the principal anchors after adaptation in the associate anchor generation unit 3022.

It should be noted that the adaptation is not limited to be used on the generated principal anchors, instead can be used on the generated reference anchor set.

Figure 6:
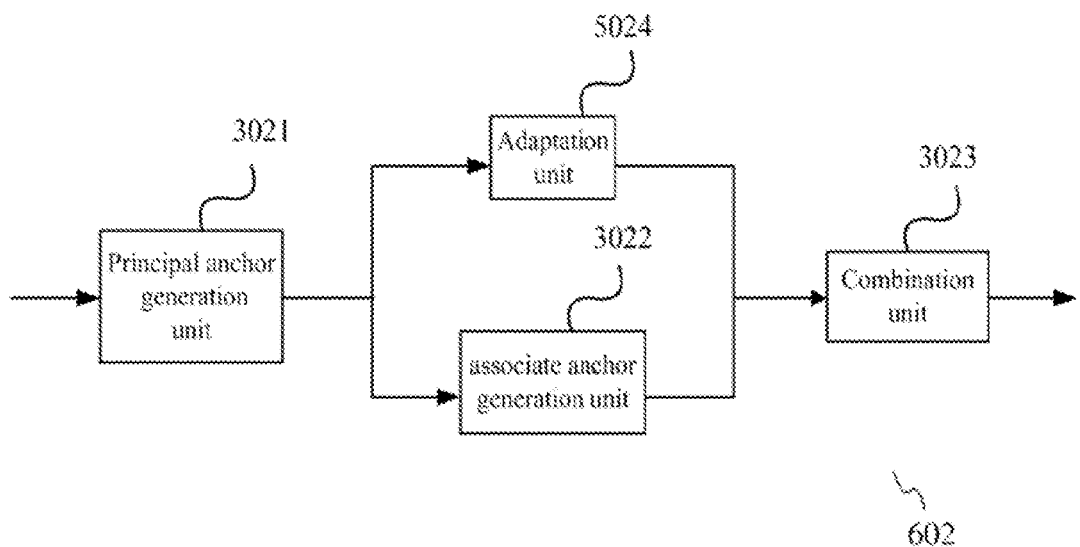
FIG. 6 shows a block diagram of a reference anchor set generation unit according to a further embodiment of the present disclosure.

FIG. 6 shows a block diagram of the reference anchor set generation unit in the modeling device 200 according to another embodiment of the present disclosure. An adaptation unit can be directly located between the principal anchor generation unit and the combination unit of the reference anchor set generation unit.

As can be seen from the FIG. 6, the reference anchor set generation unit 602 is different from the reference anchor set generation unit 502 of the FIG. 5 in that the adaptation unit 5024 and the associate anchor generation unit 3022 are located in parallel between the principal anchor generation unit 3021 and the combination unit 3023.

Specifically, the operations of the respective units shown in FIG. 6 are as follows. After the principal anchors are generated by the principal anchor generation unit 3021, the obtained principal anchors are input to the adaptation unit 5024 and the associate anchor generation unit 3022, respectively. In the adaptation unit 5024, some speaker adaptation techniques such as MLLR/MAP etc. can be used on the principal anchors for adaptation processing. In the associate anchor generation unit 3022, the generated principal anchors guide to split the anchor space and to find the associate anchors with the operations as described before with reference to FIG. 3. Then, the adapted principal anchors output from the adaptation unit 5024 and the associate anchors output from the associate anchor generation unit 3022 are input to the combination unit 3023 for combination processing, and the refined reference anchor set is obtained from combining the adapted principal anchors and the associate anchors, and is input to the voice print generation unit 203 for generating the voice prints of the target speakers, and for further use for speaker recognition.

Figure 7:
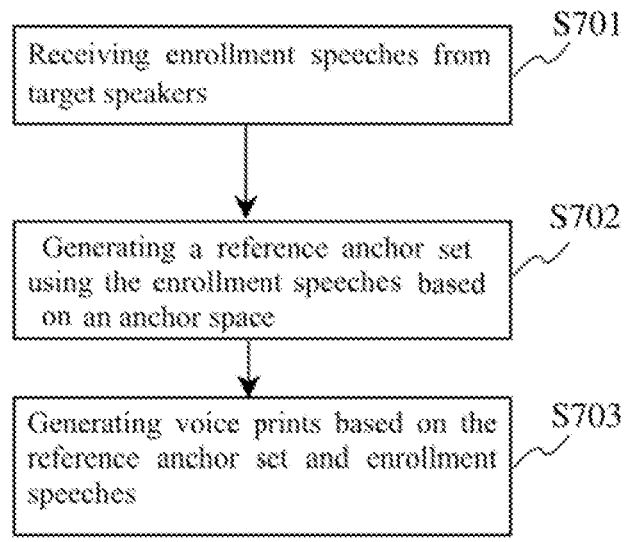
FIG. 7 shows a flow chart of a modeling method for speaker recognition according to one embodiment of the present disclosure.

FIG. 7 shows a flow chart of a method for speaker recognition according to one embodiment of the present disclosure As shown in the FIG. 7, the method for speaker recognition according to the embodiment of the present disclosure may include the following steps. In the step S701, the enrollment speeches are received from target speakers. In the step S702, a reference anchor set is generated by using the enrollment speeches based on an anchor space. In the step S703, voice prints of the target speakers are generated based on the reference anchor set and enrollment speeches. According to the present embodiment, the step S701 can be performed by the front end 201, the step S702 can be performed by any one of the reference anchor set generation units 202, 302, 502 and 602 as describe above, and the step S703 can be performed by the voice print generation unit 203.

Figure 8:
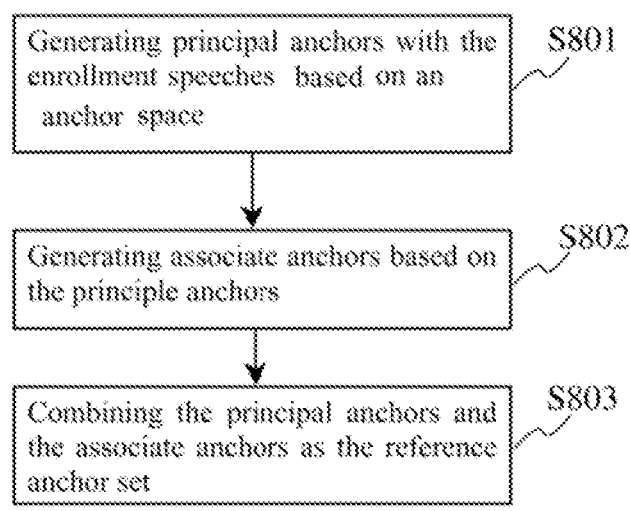
FIG. 8 shows a flow chart of a modeling method for generating the reference anchor set according to another embodiment of the present disclosure.

FIG. 8 shows a flow chart of a method for generating the reference anchor set according to one embodiment of the present disclosure. As described above, the reference anchor set is composed of principal anchors and associate anchors, and the associate anchors are generated based on the principal anchors.

Specifically, the step S702 of generating the reference anchor set as shown in the FIG. 7 may further includes sub-steps as shown in the FIG. 8. As shown in the FIG. 8, in the step S801, the principal anchors are generated by using the enrollment speeches based on an anchor space. In the step S802, the associate anchors are generated based on the generated principle anchors. In the step S803, the principal anchors and the associate anchors are combined as the reference anchor set. According to the embodiment, the steps S801 to S803 may be performed by the principal anchor generation unit 3021, the associate anchor generation unit 3022 and the combination unit 3023 respectively as described above.

According to another embodiment of the present disclosure, the step S801 further comprises a step of generating the principal anchors by finding anchor models with the nearest distance to the model of enrollment speeches from the anchor space.

According to another embodiment of the present disclosure, the step S802 further comprises steps of generating the associate anchors by splitting the anchor space into a plurality of clusters based on the principal anchors and finding anchor models with the nearest distance to the centroids of the plurality of clusters containing no principal anchors.

According to another embodiment of the present disclosure, the step S802 further comprises steps of: firstly splitting the anchor space into N clusters, wherein N equals to the number of the principal anchors, finding one cluster with the biggest intra-class distance among the N clusters to be further split, wherein if the cluster has a principal anchor, the cluster is split into two sub-clusters based on the principal anchor and an anchor with the farthest distance to the principal anchor in the cluster, while if the cluster has no principal anchor, the cluster is split into two sub-clusters based on two farthest anchors in the cluster with respect to the father principal anchor, and repeating the above process until the plurality of clusters are obtained.

According to one embodiment of the present disclosure, the method of generating the reference anchor set as shown in the FIG. 8 may further include a step of adding adaptation process after the step S801. On one hand, the principle anchors generated in the step S801 may be adapted with the enrollment speeches by using adaptation technique such as MAP and MLLR before being used to generate the associate anchors in the step S802, and the associate anchors are generated based on the principal anchors after adaptation in the step S802. On the other hand, the adaptation technique such as MAP and MLLR may be used on the principal anchors generated in the step S801, and the associate anchors are generated based on the principal anchors without adaptation in the step S802, so the combination unit 3023 combines the associate anchors and the adapted principal anchors together to obtain the reference anchor set. According to the embodiment of the present disclosure, the step of adaptation can be performed by the adaptation unit 5024 as describe above.

The execution of the above steps of the method is not limited to the above sequence, and the steps can be executed in any sequence and/or in a parallel manner. It is also possible that not all of the steps as shown are necessary to be executed.

Figure 9:
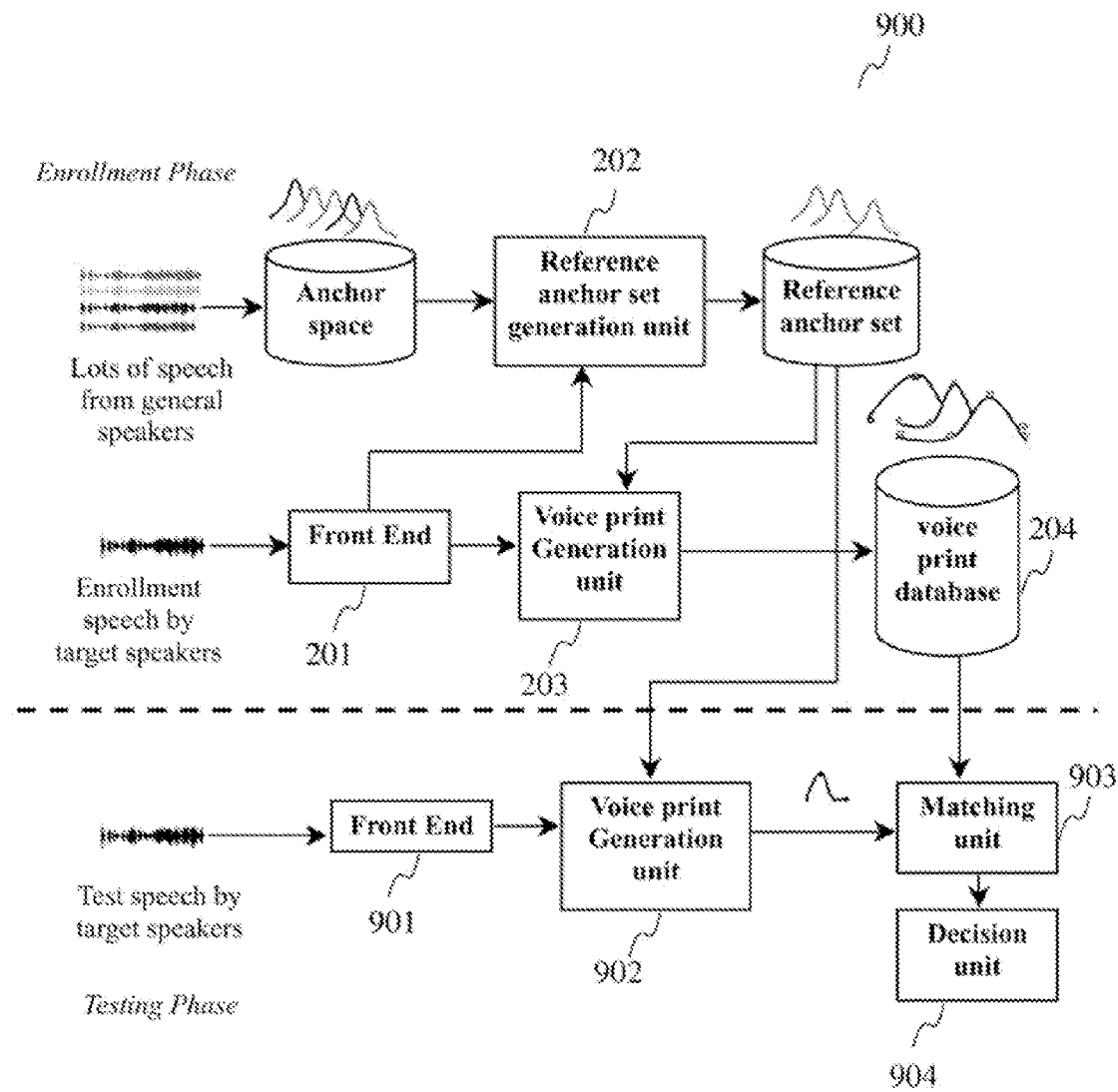
FIG. 9 shows a block diagram of a speaker recognition system according to one embodiment of the present disclosure.

FIG. 9 shows a block diagram of a speaker recognition system according to one embodiment of the present disclosure.

As shown in the FIG. 9, the whole speaker recognition system 900 is composed of two phases, one of which is an enrollment phase, and the other is a testing phase. The structure of the enrollment phase is the same as described with reference to the FIG. 2, so the details thereof are omitted hereinafter. The testing phase includes a front end 901, a voice print generation unit 902, a matching unit 903 and a decision unit 904. The front end 901 receives testing speeches by target speakers, extracts feature parameters from the testing speeches, and sends the feature parameters to the voice print generation unit 902. The front end 901 and the front end 201 can be worked as one unit, which is not limited to the above construction. The voice print generation unit 902 generates voice prints based on the feature parameters sent from the front end 901 and the reference anchor set generated by the reference anchor set generation unit 202 as describe above. Similar with the front ends 901 and 201, the voice print generation unit 902 and the voice print generation unit 203 can be worked as one unit, which is not limited to the above construction. The matching unit 903 compares the voice prints generated from the test phase with the voice prints generated from the enrollment phase, and sends the result of comparison to the decision unit 904. The decision unit 904 recognizes the identity of the target speaker based on the result, that is, if the result of comparison is more than a predetermined threshold, the identity of the target speaker will be recognized, and if the result of comparison is less than the predetermined threshold, the identity of the target speaker will be denied.

Thereby, the speaker recognition system 900 according to the embodiment of the present disclosure can be constructed as comprising: a front end 201 or 901 which receives enrollment speeches and/or testing speeches from target speakers, a reference anchor set generation unit 202 which generates a reference anchor set by using the enrollment speeches based on an anchor space, a voice print generation unit 203 or 902 which generates voice prints based on the reference anchor set and the enrollment speeches and/or testing speeches, a matching unit 903 which compares the voice prints generated from the testing speeches with the voice prints generated from the enrollment speeches, and a decision unit 904 which recognizes the identity of the target speaker based on the result of the comparison.

According to another embodiment of the present disclosure, the speaker recognition system 900 can be constructed as comprising: a modeling device and a recognition device, wherein, the modeling device comprises a first front end 201 which receives enrollment speeches from target speakers, a reference anchor set generation unit 202 which generates a reference anchor set by using the enrollment speeches based on an anchor space, and a first voice print generation unit 203 which generates first voice prints based on the reference anchor set and the enrollment speeches, the recognition device comprises a second front end 901 which receives testing speeches from the target speakers, a second voice print generation unit 902 which generates second voice prints based on the reference anchor set and the testing speeches, a matching unit 903 which compares the first voice prints with the second voice prints, and a decision unit 904 which recognizes the identity of the target speaker based on the result of comparison.

In this way, by taking the enrollment speeches and speaker adaptation technique into account, anchor models with smaller size can be generated, so reliable and robust speaker recognition with smaller size reference anchor set is possible. It brings great advantages for computation speed improvement and great memory reduction, and low computation and small reference anchor set is more suitable for embedded applications.

Several experiments are conducted to validate the effectiveness of the present disclosure. In the first experiment, the speaker identification and verification experiments on the specific size of reference anchor set are used. As shown in Table 1, the present disclosure can outperform the traditional method.

TABLE 1

|  | identification | verification |
|---|---|---|
| Traditional method | 56.58 | 65.46 |
| Traditional method w/ adaptation | 60.48 | 72.09 |
| Embodiment | 73.62 | 74.00 |
| Embodiment w/ adaptation | 75.08 | 77.29 |

Figure 10:
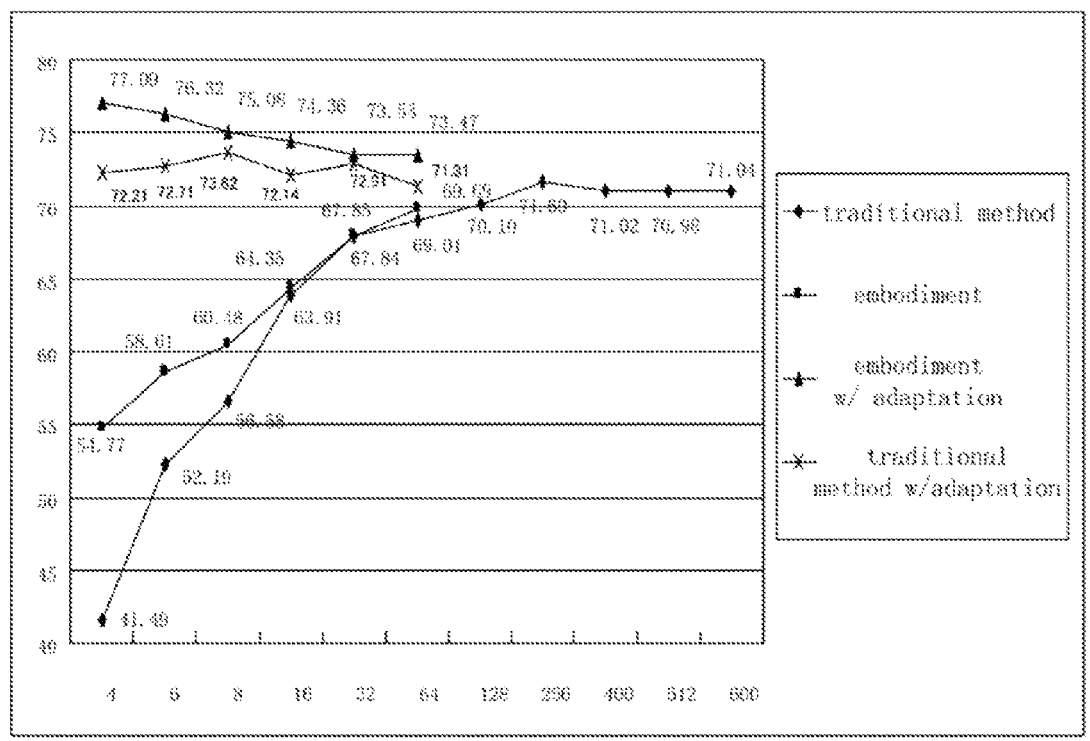
FIG. 10 shows experiment data for performance comparison with different size of reference anchor set.

In the next experiment, the influence of the reference anchor set size on speaker identification system is checked. It is observed from FIG. 10 that the present disclosure outperforms the traditional method greatly in the small size of the reference anchor set and speaker adaptation can boost the performance. In addition, it is shown there are two factors influencing the system performance. One factor is the discriminative capability of anchor models on target speakers. The initial performance of the traditional method is not good because its discriminative capability is low. With embodiment, the performance is improved because the discriminative capability is considered during anchor generation process. Furthermore, speaker adaptation on anchors could boost this capability and the performance is further improved. Besides principal anchors, associate anchors can provide additional discriminative capability, especially for rejection purpose. That is why the performance improves when anchor size increases without adaptation, shown from the curves of tradition method and embodiment in FIG. 10. The positive effect of adaptation to improve the discriminative capability reaches its maximum in small anchor case. Another factor is how stable the speaker print vector generated is, which is affected by the enrollment data size. From the curve of embodiment with adaptation in FIG. 10, the performance is degraded because it needs much more enrollment data to generate stable higher dimensional speaker print vector as anchor size increases.

When the anchor size is small, the adaptation is dominant since little enrollment data is needed for speaker print generation. When that anchor size is getting larger, much more enrollment data is necessary to generate a stable speaker print vector and the effect of adaptation decreases. In conclusion, more dimensions of voice print have more rejection capability and fewer dimensions of voice print require less enrollment data. The effect of fewer dimensions exceeds the effect of more dimensions because of additional effect of this boosting in fewer dimensions condition.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of those skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operatively connected", or "operatively coupled", to each other to achieve the desired functionality, and any two components capable of being so associated can also be viewed as being "operatively couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skills in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A modeling device for speaker recognition, comprising:
    a non-transitory memory device storing a program; and
    a hardware processor configured to execute the program and cause the modeling device to operate as:
    a front end that receives one or more enrollment speeches from one or more target speakers to generate one or more feature parameters;
    a reference anchor set generation unit that generates a reference anchor set, the reference anchor set being determined by a classification of an anchor space that is created by training a plurality of speeches from general speakers; and
    a voice print generation unit that generates one or more voice prints by applying the respective feature parameters of the enrollment speeches to anchor models of the reference anchor set,
    wherein the reference anchor set is determined during the classification using the feature parameters of the enrollment speeches to include one or more principal anchors, each being an anchor model with a nearest distance to a model of a corresponding one of the enrollment speeches from among the anchor space.

2. The modeling device according to claim 1, wherein the reference anchor set is composed of the principal anchors and one or more associate anchors, and the associate anchors are generated based on the principal anchors.

3. The modeling device according to claim 2, wherein the anchor space includes a plurality of anchor models.

4. The modeling device according to claim 2, wherein the associate anchors are each generated by splitting the anchor space into a plurality of clusters in such a way that at least one of the plurality of clusters includes the principal anchor and at least one of the plurality of clusters includes no principal anchor, and by selecting an anchor model with a nearest distance to a centroid of a corresponding one of clusters including no principal anchors from among the plurality of clusters.

5. The modeling device according to claim 4, wherein the anchor space is split into the plurality of clusters by: firstly splitting the anchor space into N clusters, wherein N equals to the number of the principal anchors; finding one cluster with a biggest intra-class distance among the N clusters to be further split, wherein if the cluster has the principal anchor, the cluster is split into two sub-clusters based on the principal anchor and an anchor with the farthest distance to the principal anchor in the cluster, while if the cluster has no principal anchor, the cluster is split into two sub-clusters based on two farthest anchors in the cluster with respect to a farther principal anchor; and repeating the above process until the plurality of clusters are obtained.

6. The modeling device according to claim 3, wherein the distance is a likelihood value.

7. The modeling device according to claim 2, wherein the principal anchors are adapted with the enrollment speeches by adaptation method of MAP or MLLR, and the associate anchors are generated based on the principal anchors after adaptation.

8. The modeling device according to claim 2, wherein the principal anchors are adapted with the enrollment speeches by adaptation method of MAP or MLLR, and the associate anchors and the adapted principal anchors are combined as the reference anchor set.

9. A modeling method for speaker recognition, comprising:
    receiving one or more enrollment speeches from one or more target speakers to generate one or more feature parameters;
    generating a reference anchor set, the reference anchor set being determined by a classification of an anchor space that is created by training a plurality of speeches from general speakers; and
    generating one or more voice prints by applying the respective feature parameters of the enrollment speeches to anchor models of the reference anchor set,
    wherein the reference anchor set is determined during the classification using the feature parameters of the enrollment speeches to include one or more principal anchors, each being an anchor model with a nearest distance to a model of a corresponding one of the enrollment speeches from among the anchor space.

10. The modeling method according to claim 9, wherein the reference anchor set is composed of the principal anchors and one or more associate anchors, and the method further comprising generating the associate anchors based on the principal anchors.

11. The modeling method according to claim 10, wherein the anchor space includes a plurality of anchor models.

12. The modeling method according to claim 10, further comprising generating the associate anchors by splitting the anchor space into a plurality of clusters in such a way that at least one of the plurality of clusters includes the principal anchor and at least one of the plurality of clusters includes no principal anchor, and by selecting an anchor model with a nearest distance to a centroid of a corresponding one of clusters including no principal anchors from among the plurality of clusters.

13. The modeling method according to claim 12, wherein the anchor space is split into the plurality of clusters by:
    firstly splitting the anchor space into N clusters, wherein N equals to the number of the principal anchors;
    finding one cluster with the biggest intra-class distance among the N clusters to be further split, wherein if the cluster has the principal anchor, the cluster is split into two sub-clusters based on the principal anchor and an anchor with the farthest distance to the principal anchor in the cluster, while if the cluster has no principal anchor, the cluster is split into two sub-clusters based on two farthest anchors in the cluster with respect to the a farther principal anchor; and repeating the above process until the plurality of clusters are obtained.

14. The modeling method according to claim 11, wherein the distance is a likelihood value.

15. The modeling method according to claim 10, further comprising:
adapting the principal anchors with the enrollment speeches by adaptation method of MAP or MLLR; and
generating the associate anchors based on the principal anchors after adaptation.

16. The modeling method according to claim 10, further comprising:
adapting the principal anchors with the enrollment speeches by adaptation method of MAP or MLLR; and
combining the associate anchors and the adapted principal anchors as the reference anchor set.

17. A speaker recognition system comprising:
a non-transitory memory device storing a program; and
a hardware processor configured to execute the program and cause the speaker recognition system to operate as:
a front end that receives one or more enrollment speeches and/or testing speeches from one or more target speakers to generate one or more features parameters;
a reference anchor set generation unit that generates a reference anchor set, the reference anchor set being determined by a classification of an anchor space that is created by training a plurality of speeches from general speakers;
a voice print generation unit that generates one or more voice prints by applying the respective feature parameters of the enrollment speeches and/or testing speeches to anchor models of the reference anchor set;
a matching unit that compares the voice prints generated from the testing speeches with the voice prints generated from the enrollment speeches; and
a decision unit that recognizes an identity of the target speaker based on a result of the comparison,
wherein the reference anchor set is determined during the classification using the feature parameters of the enrollment speeches to include one or more principal anchors, each being an anchor model with a nearest distance to a model of a corresponding one of the enrollment speeches from among the anchor space.

18. The speaker recognition system according to claim 17, wherein the reference anchor set is composed of the principal anchors and one or more associate anchors, and the associate anchors are generated based on the principal anchors.

19. The speaker recognition system according to claim 18, wherein the anchor space includes a plurality of anchor models.

20. The speaker recognition system according to claim 18, wherein the associate anchors are each generated by splitting the anchor space into a plurality of clusters in such a way that at least one of the plurality of clusters includes the principal anchor and at least one of the plurality of clusters includes no principal anchor, and by selecting an anchor model with a nearest distance to a centroid of a corresponding one of clusters including no principal anchors from among the plurality of clusters.

21. The speaker recognition system according to claim 20, wherein the anchor space is split into the plurality of clusters by: firstly splitting the anchor space into N clusters, wherein N equals to the number of the principal anchors; finding one cluster with the biggest intra-class distance among the N clusters to be further split, wherein if the cluster has the principal anchor, the cluster is split into two sub-clusters based on the principal anchor and an anchor with the farthest distance to the principal anchor in the cluster, while if the cluster has no principal anchor, the cluster is split into two sub-clusters based on two farthest anchors in the cluster with respect to a farther principal anchor; and repeating the above process until the plurality of clusters are obtained.

22. The speaker recognition system according to claim 19, wherein the distance is a likelihood value.

23. The speaker recognition system according to claim 18, wherein the principal anchors are adapted with the enrollment speeches by adaptation method of MAP or MLLR, and the associate anchors are generated based on the principal anchors after adaptation.

24. The speaker recognition system according to claim 18, wherein the principal anchors are adapted with the enrollment speeches by adaptation method of MAP or MLLR, and the associate anchors and the adapted principal anchors are combined as the reference anchor set.

25. A speaker recognition system comprising a modeling device and a recognition device, wherein
the modeling device comprises:
a non-transitory memory device storing a program; and
a hardware processor configured to execute the program and cause the modeling device to operate as:
a first front end that receives one or more enrollment speeches from one or more target speakers to generate one or more feature parameters;
a reference anchor set generation unit that generates a reference anchor set, the reference anchor set being determined by a classification of an anchor space that is created by training a plurality of speeches from general speakers; and
a first voice print generation unit that generates one or more first voice prints by applying the respective feature parameters of the enrollment speeches to anchor models of the reference anchor set; and
the recognition device comprises:
a non-transitory memory device; and
a hardware processor configured to execute the program and cause the recognition device to operate as:
a second front end receives one or more testing speeches from the target speakers to generate one or more feature parameters;
a second voice print generation unit that generates one or more second voice prints by applying the respective feature parameters of the testing speeches to the anchor models of the reference anchor set;
a matching unit that compares the first voice prints with the second voice prints; and
a decision unit that recognizes an identity of the target speaker based on a result of the comparison,
wherein the reference anchor set is determined during the classification using the feature parameters of the enrollment speeches to include one or more principal anchors, each being an anchor model with a nearest distance to a model of a corresponding one of the enrollment speeches from among the anchor space.

* * * * *